United States Patent
Parat (10) Patent No.: US 10,086,763 B2
(45) Date of Patent: Oct. 2, 2018

(54) SYSTEM AND METHOD FOR ENHANCING VEHICLE ENVIRONMENT PERCEPTION

(71) Applicant: GM GLOBAL TECHNOLOGY OPERATIONS LLC, Detroit, MI (US)

(72) Inventor: Shreyas G. Parat, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 15/213,440

(22) Filed: Jul. 19, 2016

(65) Prior Publication Data

US 2018/0022278 A1  Jan. 25, 2018

(51) Int. Cl.
| | |
|---|---|
| B60R 1/00 | (2006.01) |
| B60R 1/12 | (2006.01) |
| B60R 11/04 | (2006.01) |
| H04N 5/225 | (2006.01) |
| H04N 5/232 | (2006.01) |
| B60R 11/00 | (2006.01) |

(52) U.S. Cl.
CPC .............. B60R 1/002 (2013.01); B60R 1/12 (2013.01); B60R 11/04 (2013.01); H04N 5/2252 (2013.01); H04N 5/23293 (2013.01); B60R 2001/1253 (2013.01); B60R 2011/004 (2013.01); B60R 2300/105 (2013.01); B60R 2300/8026 (2013.01)

(58) Field of Classification Search
CPC .......... B60R 1/002; B60R 1/12; B60R 11/04; B60R 2001/1253; B60R 2011/004; B60R 2300/105; B60R 2300/8026; H04N 5/2252; H04N 5/23293

See application file for complete search history.

(56) References Cited

U.S. PATENT DOCUMENTS

| | | | |
|---|---|---|---|
| 5,303,205 A * | 4/1994 | Gauthier ............. | B60Q 1/0023 367/108 |
| 9,384,402 B1 * | 7/2016 | Furman .............. | G06K 9/00805 |
| 2002/0118282 A1 * | 8/2002 | Nakamura ........... | B60Q 1/2665 348/148 |
| 2016/0193971 A1 * | 7/2016 | Yellambalase ........... | B60R 1/00 348/148 |
| 2016/0325753 A1 * | 11/2016 | Stein .................... | B60W 40/06 |

* cited by examiner

*Primary Examiner* — Michael E Teitelbaum (57) ABSTRACT

A system method to enhance vehicle-environment perception are provided. The system includes a memory comprising one or more executable instructions, a controller configured to read and execute the one or more executable instructions, a camera configured to view or capture or view and capture an image of a selected portion of the vehicle environment, a display configured to exhibit information, a user input configured to allow one or more commands to be provided to the system. The executable instructions moreover enable the controller to operate the camera based on the one or more commands, retrieve information of the selected portion of the vehicle environment, generate perception information from the retrieved information, and exhibit the perception information.

16 Claims, 6 Drawing Sheets

SYSTEM AND METHOD FOR ENHANCING VEHICLE ENVIRONMENT PERCEPTION

Systems and methods consistent with the exemplary embodiments herein relate to the enhancement of vehicle environment perception. More particularly, these systems and methods relate to the enhancement of vehicle environment perception through the implementation of cameras which view the vehicle's environment and displays that exhibit such an environment.

Drivers operating unfamiliar vehicles may be uncertain of the exact boundaries of their vehicle. This uncertainty may cause the driver to be unreasonably cautious and create unwanted feelings of unease while operating the vehicle. It is therefore desirable for a driver to enhance their perception of the environment which surrounds their vehicle.

SUMMARY

A system to enhance vehicle-environment perception is herein presented. The system includes a memory having one or more executable instructions, a controller configured to read and execute the one or more executable instructions, a camera configured to view or capture or view and capture an image of a selected portion of the vehicle environment, a display configured to exhibit information, a user input configured to allow one or more commands to be provided to the system. The executable instructions moreover enable the controller to operate the camera based on the one or more commands, retrieve, from the camera, information of the selected portion of the vehicle environment, generate perception information from the retrieved information of the selected portion of the vehicle environment, and exhibit, through the display, the retrieved perception information.

The system may further include a sensor configured to determine when the vehicle encounters a road surface feature and send a corresponding sensor signal to the controller. The executable instructions moreover enable the controller to retrieve the sensor signal and activate the camera to view or capture or view and capture an image of the selected portion of the vehicle environment. The system may also further include a communication device configured to signally communicate with a remote party. The executable instructions may moreover enable the controller to retrieve the sensor signal and, via the communication device, send an output signal to the remote party.

The road surface feature encountered by the vehicle may be a pothole, speed bump, curb, racetrack finish line, road lane indicators, mud pits, water puddles, or a wet surface. The camera may be positioned at the side-view mirror assembly of the vehicle. The display may be configured to exhibit the perception information at the side-view mirror assembly or the display may be configured to exhibit the perception information at the console screen of the vehicle infotainment unit. The selected portion of the vehicle environment may substantially incorporate the location at which a front tire and its respective underlying surface meet. The executable instructions may further enable the controller to record and store the perception information to the memory.

Another system to enhance vehicle-environment perception is herein presented. The system includes a memory having one or more executable instructions, a controller configured to read and execute the one or more executable instructions, at least two cameras configured to view or capture or view and capture images of selected portions of the vehicle environment, a display configured to exhibit information, a user input configured to allow one or more commands to be provided to the system. The executable instructions may enable the controller to operate the cameras based on the one or more commands, retrieve, from the cameras, information of the selected portions of the vehicle environment, generate perception information from the retrieved information of the selected portions of the vehicle environment, and exhibit, through the display, the perception information from at least one of the cameras.

The system may further include a sensor configured to determine when the vehicle encounters a road surface feature and send a corresponding sensor signal to the controller. The executable instructions may further enable the controller to retrieve the sensor signal and activate at least one of the cameras to view or capture or view and capture at least one image from the selected portions of the vehicle environment. The system may also further include a communication device configured to signally communicate with a remote party. The executable instructions may also enable the controller to retrieve the sensor signal and, via the communication device, send an output signal to the remote party.

The road surface feature encountered by the vehicle may be a pothole, speed bump, curb, racetrack finish line, road lane indicators, mud pits, water puddles, or a wet surface. An additional display may be configured to exhibit additional information. The at least two cameras may therefore be positioned at first and second side-view mirror assemblies of the vehicle and the display may be configured to exhibit the perception information at the first side-view mirror assembly and the additional display is configured to exhibit the additional perception information at the second side-view mirror assembly.

The cameras may be positioned at first and second side-view mirror assemblies of the vehicle. The display may be configured to exhibit information at the console screen of the vehicle infotainment unit. The selected portions of the vehicle environment may substantially incorporate the locations where each front tire and its respective underlying surface meet. The executable instructions may further enable the controller to record and store the perception information to the memory.

A method to enhance vehicle-environment perception is also herein presented. The method includes the operations of providing a camera positioned at the side-view mirror assembly of a vehicle, the camera configured to view or capture or view and capture an image of the location at which a front tire and its respective underlying surface meet, providing a display configured to exhibit information, providing a user input configured to allow one or more commands to be provided to the camera, commanding operation of the camera, via the user input, viewing or capturing or viewing and capturing, via the camera, an image of the selected portion of a vehicle environment, retrieving from the camera, via the controller, information of the selected portion of the vehicle environment, generating perception information, via the controller, from the retrieved information of the selected portions of the vehicle environment, and exhibiting, via the display, the perception information. The display may be configured to exhibit the perception information at the side-view mirror assembly or the display may be configured to exhibit the perception information at the console screen of the vehicle infotainment unit.

DETAILED DESCRIPTION

A system and method to enhance vehicle-environment perception will now be described in detail with reference to FIGS. 1-7 of the accompanying drawings in which like reference numerals refer to like elements throughout. The following disclosure will enable those skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

The vehicle environment should be considered the physical locations which surround all boundaries of a vehicle. The vehicle environment does not generally extend beyond five yards of such boundaries. It should moreover be appreciated that the vehicle may be, but is not limited to, a passenger car, motorcycle, truck, sports utility vehicle (SUVs), recreational vehicle (RVs), marine vessel, or aircraft.

The exemplary systems and methods discussed below provide drivers (i.e., vehicle operators) the benefit of having an enhanced perception (i.e., visibility) of the environment which surrounds the vehicle being operated. Such an enhanced perception may ultimately add a layer of safety and driver comfort as well as allow the driver to be more knowledgeable about the performance of their vehicle. The following examples, for instance, may facilitate parking and avoid curb rash for vehicles difficult for their driver to maneuver.

For enthusiasts, the following examples may provide differing benefits depending on the road surface. Drivers taking high-performance vehicles to a racetrack may implement the exemplary systems and methods to visually record vehicle movement during laps. Recording this movement may help the driver study vehicle/wheel positioning around turns, so as to ultimately improve racing times and eventually provide the driver the choice of taking the best times on the track. Drivers taking their vehicles off road (e.g., full-size/mid-size trucks), however, may implement the exemplary systems and methods to better understand tire position in light of the surrounding terrain. Understanding tire position may help the driver move safely from one point to another while in difficult conditions.

Figure 1:
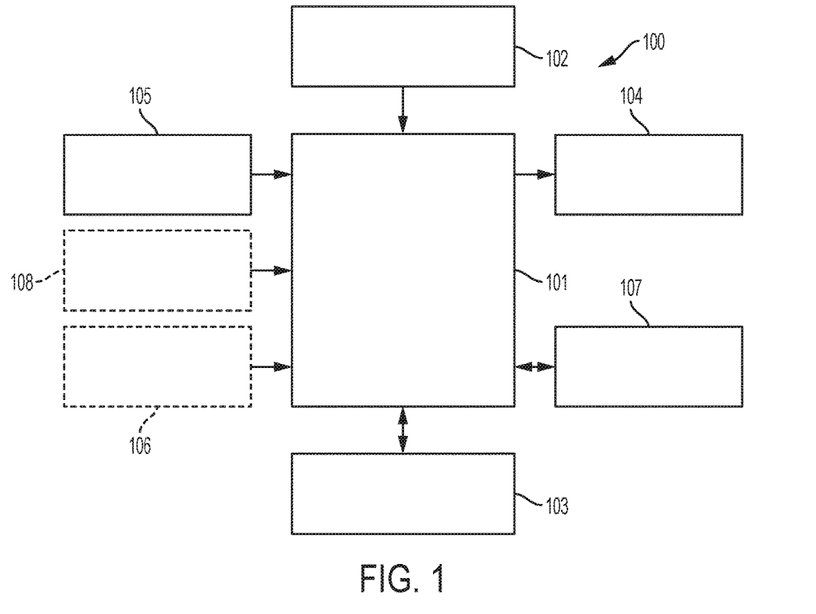
FIG. 1 shows an exemplary block diagram of an exemplary embodiment of a system to enhance vehicle environment perception.

Referring to the drawings in detail, and specifically to FIG. 1, a block diagram of an exemplary system to enhance vehicle-environment perception is generally indicated by reference numeral 100. As shown, the disclosed system 100 includes a controller 101, a power supply 102, a memory 103, a display 104, a user input 105, and a camera 107. System 100 may further include a vibratory sensor 106 and a communication device 108. However, system 100 is not limited to the aforementioned configuration and may be configured to include additional elements and/or omit one or more of the aforementioned elements.

Controller 101 essentially controls the overall operation and function of system 100. Upon reading and executing one or more executable instructions, controller 101 may control, send, and/or receive information from one or more of memory 103, display 104, user input 105, vibratory sensor 106, camera 107, and communication device 108. Controller 101 may include one of, but is not limited to, a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

Power supply 102 provides power to one or more of the controller 101, memory 103, display 104, user input 105, vibratory sensor 106, camera 107, and communication device 108 of system 100. The power supply 102 may include, but is not limited to, a battery, an outlet, a capacitor, a solar energy cell, a generator, a wind energy device, an alternator, etc.

Memory 103 is configured for recording information, storing information, and retrieving information used by system 100. Memory 103 may include one or more modules of executable instructions configured to be read and executed by controller 101, so as to perform the functions of system 100. Memory 103 may also be controlled by controller 101 to record, store, and retrieve perception information that may include one or more various types of information such as, but not limited to, vehicle-environment information, information on an environment of the vehicle, information of a particular environment in which vehicle is located, information on a vehicle, information on passengers of a vehicle, information on a travel route, and timestamp information.

The vehicle-environment information may be video data viewed or image data captured through camera 107 at the location of the vehicle, e.g., street scene images, off-road scene images, and racetrack scene images. The information on an environment of the vehicle may include, but is not limited to, a name of a road, a name of a city, a name of a state, a name of a country, a postal code, a segment of a road, a lane of a road and coordinate information. The information of a particular environment in which vehicle is located may include, but is not limited to, an environmental sound, a vibration, an ambient temperature, vehicle speed, a road surface type, a road surface feature, an environmental anomaly, and road severity information (e.g., the degree of damage to a road). The information on passengers of a vehicle may include a number of passengers in a vehicle and passenger location in a vehicle. The information on a vehicle may include information on vehicle components such as windows, lift-gates, sunroofs, seat positions, etc.

One of ordinary skills should understand that a road surface feature may be a pothole, speed bump, curb, racetrack finish line, road lane indicators, mud pits, water puddles, a wet surface, a dry surface, etc. The road surface type may be, but is not limited to, concrete, asphalt, gravel, dirt, mud. The sound may be detected by transducers, microphones, etc., placed at various locations around a vehicle including, the interior cabin, the wheel well, etc. The vibrations may be detected by vibratory sensor 106 and may be one or more accelerometers placed at various locations around a vehicle including, the interior cabin, the steering wheel, the wheel well, etc. The information on a travel route may include, but is not limited to, street maps uploaded to memory 103 based on the location of the vehicle. The timestamp information may indicate times when images are being viewed or captured through camera 107.

Memory 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

Memory 103 may include a database that is configured to record and store the perception information including, but not limited to, vehicle-environment information, information on an environment of the vehicle, information of a particular environment in which vehicle is located, information on a vehicle, information on passengers of a vehicle, information on a travel route, and timestamp information. An entry in the database may include, for example, but is not limited to, vehicle-environment information, information on an environment of the vehicle, information of a particular environment in which vehicle is located, information on a vehicle, information on passengers of a vehicle, information on a travel route, and timestamp information.

Display 104 generally presents an exhibit of visual information (e.g., perception information) that may be in an electronic form. Display 104 may be controlled by controller 101 to provide this exhibited information to the system user. Display 104 may include electronics which allow the visual information to be exhibited through an OLED screen, LED screen, LCD screen, or a holographic display as known in the art. In addition, display 104 may be further configured to generate a notification that includes, but is not limited to, a visual notification, an audible notification, or light notification. As discussed below, display 104 may moreover be located at the console screen of the vehicle infotainment unit or within one or both of the side-view mirror assemblies of the vehicle.

User input 105 is configured to provide information and commands to system 100 and may be used to allow one or more commands to be provided to controller 101. User input 105 may include, but is not limited to, a touchscreen (via virtual buttons), a keyboard, a soft keypad, a button, a motion detector, a voice input detector, a microphone, a camera, a trackpad, a mouse, a touchpad, etc. User input 105 may be configured to receive a user command to acknowledge or dismiss the notification generated by display 104. User input 105 may also be configured to activate or deactivate system 100 or camera 107.

As discussed above, vibratory sensor 106 may be one or more accelerometers placed at various locations around a vehicle. The vibratory sensor 106 can detect when the vehicle encounters a road feature. For example, vibratory sensor 106 can detect when one or more of the vehicle's tires encounter a pot hole on the road surface or when the vehicle crashes into a physical object (e.g., tree limb, animal, road curb, etc.). Upon such an encounter, vibratory sensor 106 may send a sensor signal to controller 101. These sensor signals may be recorded by controller 101 and stored in memory 103.

Camera 107 may be an optical instrument for viewing or capturing images, which may be stored locally before being transmitted to controller 101, as is generally known in the art. Examples of camera 107 may include, but are not limited to, varieties of digital single lens reflex cameras, mirrorless cameras, and compact cameras. The images may be digital and exemplified as being captured as individual still photographs or viewed as a sequence of images to constitute a video. As such, when camera 107 may be directed to view or capture or both view and capture an image of a selected portion of the vehicle environment.

Communication device 108 may be used by system 100 to communicate with various types of external, remote parties. Communication device 108 may be used to send/receive perception information, including, but not limited to, vehicle-environment information, information on an environment of the vehicle, information of a particular environment in which vehicle is located, information on a vehicle, information on passengers of a vehicle, information on a travel route, and timestamp information. Communication device 108 may also be configured to transmit/receive instructions to operate system 100 to/from a mobile device such as mobile phone, smart watch, laptop, tablet, etc.

Communication device 108 may moreover be configured to detect information on a location of the vehicle by sending and receiving information containing signals to a remote party. The information signals may be detected by or from remote parties such as, but not limited to, a constellation of global positioning system (GPS) satellites, a call center, a computing device, or mobile computing device. For example, the remote GPS satellites may detect vehicle coordinates and the coordinates may be used along with information from a speedometer, a compass, an accelerometer, and/or camera 107 to determine location information such as a name of a road, a name of a city, a name of a state, a name of a country, a postal code, a segment of a road, a lane of a road and/or coordinate information.

The communication device 108 may include various communication modules of executable instructions. Such modules may include, but are not limited to, a GPS module, a broadcast receiving module, a near field communication (NFC) module, a wired communication module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method.

The GPS module is a module that receives a GPS signal from one or more GPS satellites of the constellation and detects a current location. The wired communication module may be a module that receives information over a wired network such as a local area network, a controller area network (CAN), or an external network, via Ethernet cable, fiber optic cable, coaxial cable, etc. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as 3rd generation (3G), 3rd generation partnership project (3GPP), long term evolution (LTE), Bluetooth, or ZigBee.

According to an exemplary aspect, controller 101 is configured to operate camera 107 based on the one or more commands from user input 105, retrieve information of the selected portion of the vehicle environment, from camera 107, generate perception information from the retrieved information, and exhibit the perception information, through display 104.

Controller 101 may be further configured to retrieve a sensor signal sent from vibratory sensor 106 and activate camera 107 to view or capture an image of the selected portion of the vehicle environment. Controller 101 may be further yet be configured to retrieve the sensor signal from vibratory sensor 106 and send an output signal to a remote party through the communication device 108. According to another exemplary aspect, controller 101 may be configured to record and store the perception information to the memory.

Figure 2:
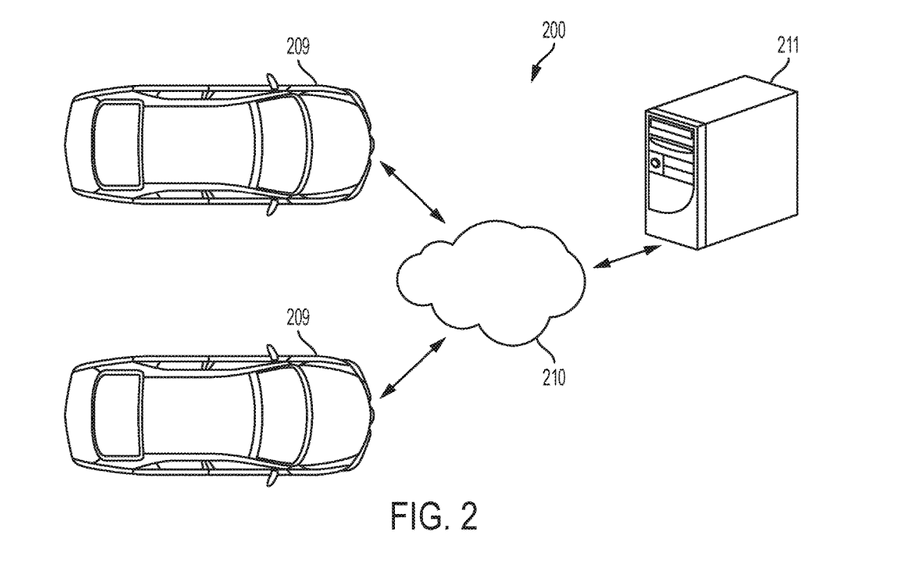
FIG. 2 shows an exemplary diagram of the exemplary system to enhance vehicle environment perception.

FIG. 2 shows a diagram of a system 200 to enhance vehicle-environment perception according to an exemplary aspect. Referring to FIG. 2, as discussed above, one or more vehicles 209 may also implement communication device 108 to transmit and receive information over network 210 to and from a memory 203 (discussed above) generally located within a remote server 211. The perception information that may be transmitted or received or both transmitted and received by vehicle 209 may include, but is not limited to, as discussed above, vehicle-environment information, information on an environment of the vehicle, information of a particular environment in which vehicle 209 is located, information on a vehicle 209, information on passengers of vehicle 209, information on a travel route, and timestamp information. In order to transmit and receive information over network 210 as well as perform the functions that enhance vehicle-environment perception, vehicles 209 or server 211 or both vehicles 209 and server 211 may include one or more controllers 201 (discussed above) configured to execute instructions stored in memory 203 of server 211.

Figure 3:
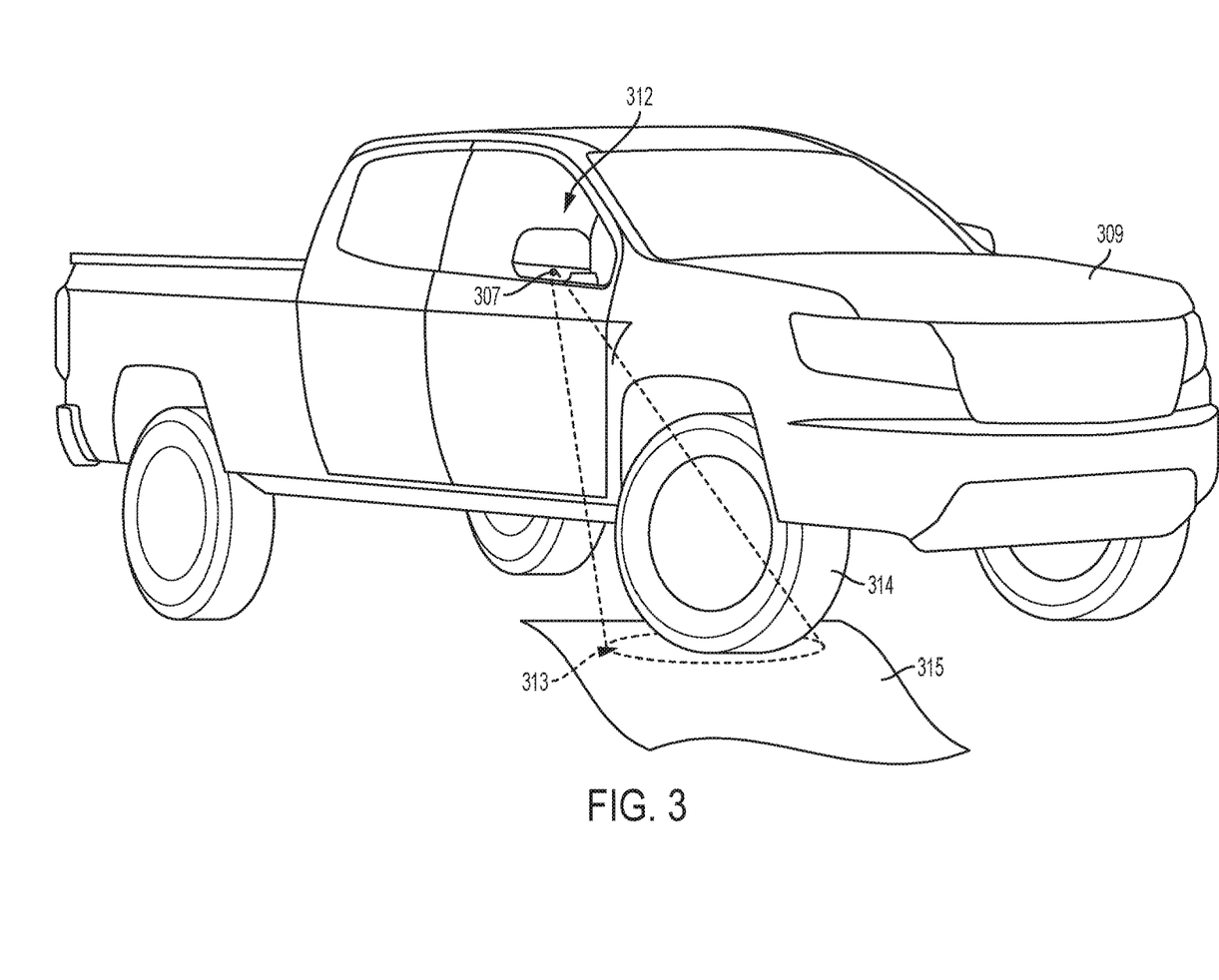
FIG. 3 shows aspects of the exemplary system to enhance vehicle environment perception as being implemented within an exemplary vehicle environment.

FIG. 3 shows an exemplary aspect of system 300 wherein camera 307 is positioned at the side-view mirror assembly 312 of vehicle 309. As can be seen, camera 307 is mounted to the front, forward-facing side of mirror assembly 312 and may be directed towards the location 313 at which the corresponding front tire 314 of vehicle 309 and its respective underlying road surface 315 meet. It should be appreciated that camera 307 may be joined to mirror assembly 312 through a welding process, adhesives, or a socket configuration that may be molded into the body of mirror assembly 312.

Figure 4:
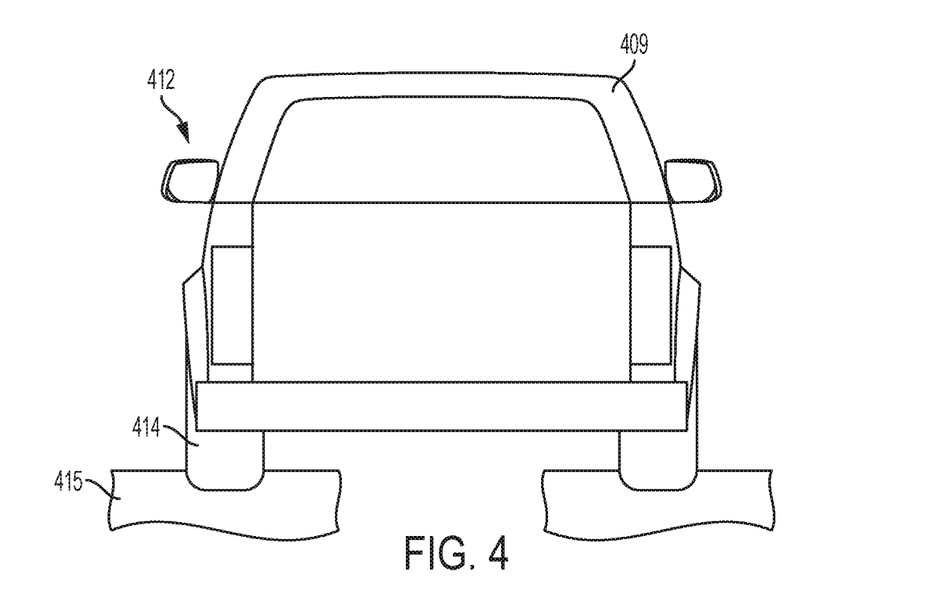
FIG. 4 shows other aspects of the exemplary system to enhance vehicle environment perception.
Figure 4A:
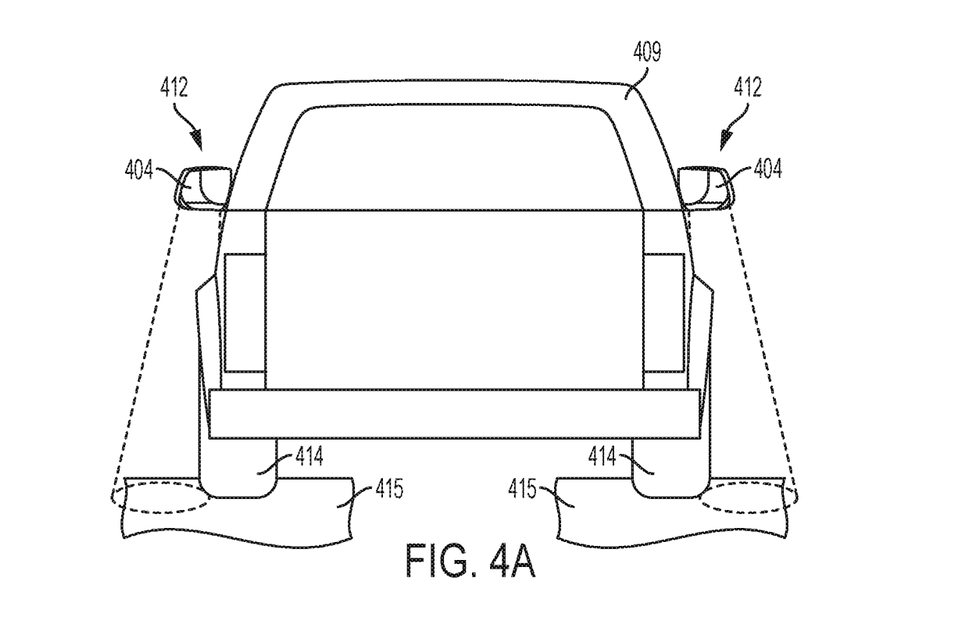
FIG. 4A shows additional aspects of the system of FIG. 4.

FIGS. 4 and 4A show another exemplary aspect of system 400 wherein cameras are positioned at both of the side-view mirror assemblies 412 of vehicle 409. As shown, when system 400 has been commanded to be in operation, as discussed above, display 404 is configured to exhibit the perception information at each side-view mirror assembly 412 (i.e., the location at which the corresponding front tire of vehicle and its respective underlying road surface meet).

Figure 5:
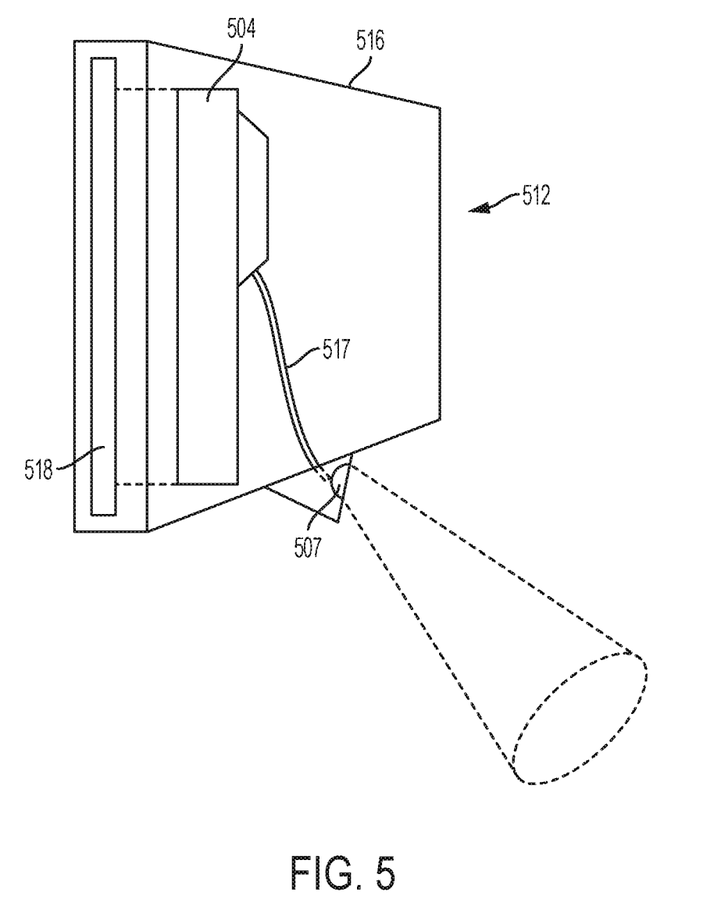
FIG. 5 shows an exemplary embodiment of certain features of the exemplary system to enhance vehicle environment perception.

At least one side-view mirror assembly 512 configurations can be seen in further detail in FIG. 5. As shown in this example, mirror assembly 512 includes a housing 516 with camera 507 mounted to the underlying side of housing 516. Camera 507 is coupled to the independent electronic components (e.g., controller) of display 504 via an electrical conduit 517. Camera 507 is positioned such that the line of sight is opposite that of the exhibited view of display 504. Camera 507 is moreover configured to view or capture or view and capture an image of the vehicle environment towards the front side of vehicle (see FIGS. 4 and 4A). Furthermore, display 504 is positioned behind a mirror 518 which allows light to pass through the reflective side of mirror 518 from behind. As such, during operation of system 500, exhibited information from display 504 may be viewed by the driver while looking at mirror 518. It should be appreciated that mirror 518 may be manufactured from an acrylic material.

Figure 6:
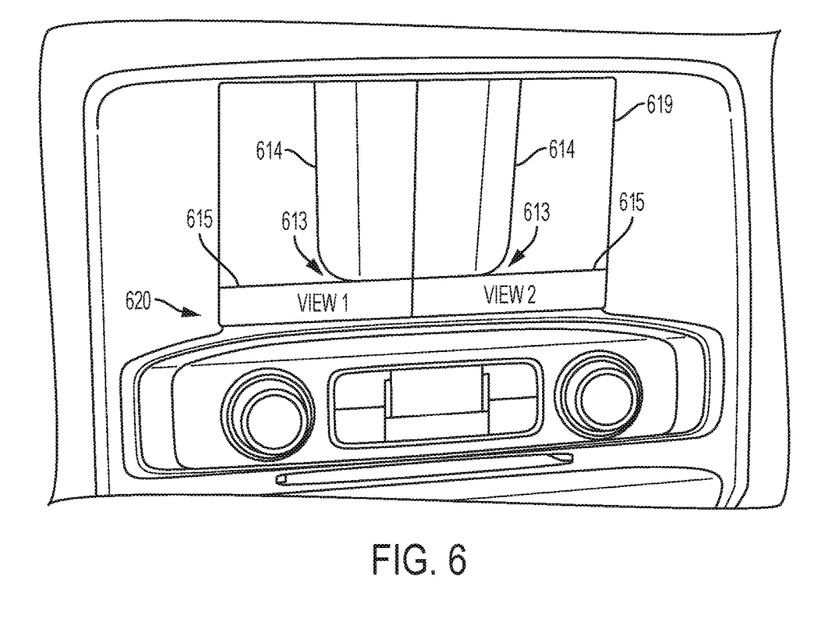
FIG. 6 shows another exemplary embodiment of certain features of the exemplary system to enhance vehicle environment perception.

FIG. 6 shows another exemplary aspect of system 600 wherein the display is configured to exhibit the perception information at the console screen 619 of the vehicle infotainment unit 620. As shown in this example, both locations 613 where the front tires and respective underlying road surface meet are exhibited simultaneously. However, skilled artisans will understand that one location 613 may be exhibited at a time. Skilled artisans will moreover understand that infotainment unit 620 may not necessarily have the configuration as disclosed in FIG. 6.

An exemplary method 730 to enhance vehicle environment perception are best described with reference to FIG. 7. Method 730 may be performed by any of the examples of system 100, as discussed above, or may be encoded into a computer-readable medium as instructions that are executable by a computer to perform the method 730. Additionally, the operations of method 730 may be performed by system 100 when embedded in a vehicle, a server that is in communication with the vehicle over a network, or a combination of the server that communicates with the vehicle over a network and system 100 while embedded in the vehicle.

Figure 7:
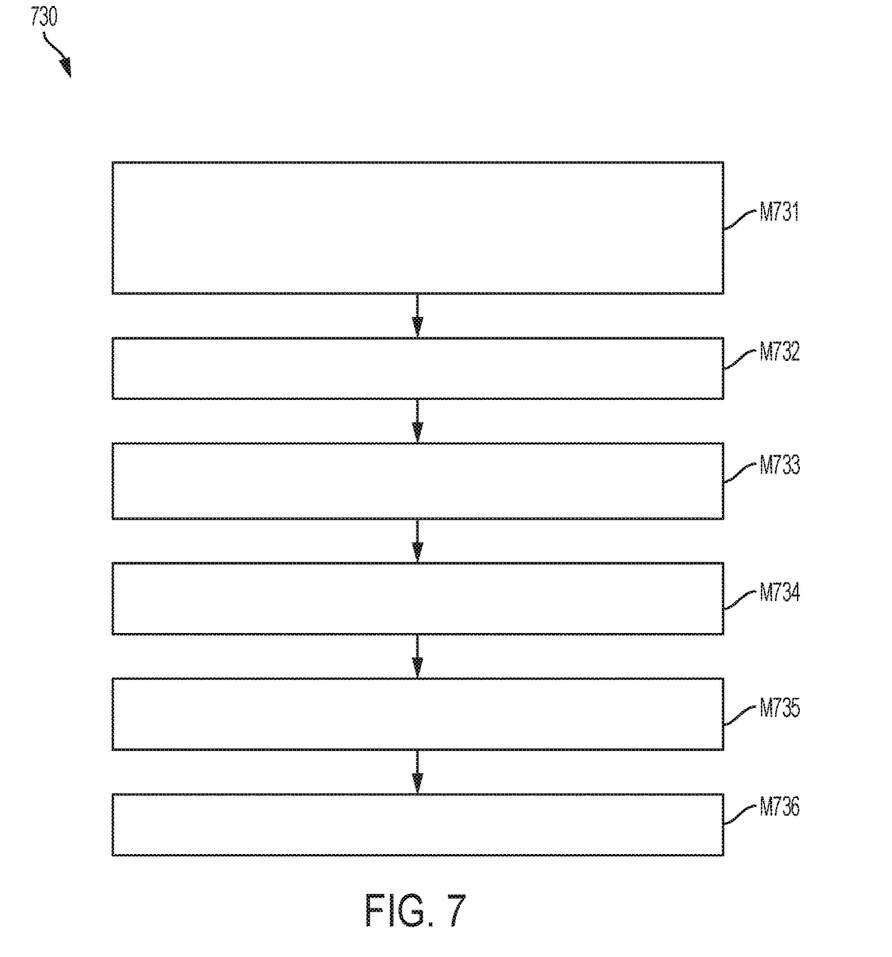
FIG. 7 shows a flow chart generally illustrating a method that may be performed to enhance vehicle environment perception.

Referring to FIG. 7, a driver (i.e., vehicle operator) is provided a camera positioned at the side-view mirror assembly of a vehicle, the camera configured to view or capture or view and capture an image of the location at which a front tire and its respective underlying surface meet in operation M731. During operation M731, the driver is further provided a display configured to exhibit information. During operation M731, the driver is further yet provided a user input configured to allow one or more commands to be provided to the camera. In operation 732, method 730 includes commanding operation of the camera, which may be conducted via the user input and may be conducted by the driver or may be conducted by a passenger. In operation 733, method 730 includes viewing or capturing or viewing and capturing an image of the selected portion of a vehicle environment, which may be conducted via the camera. In operation 734, method 730 includes retrieving from the camera information of the selected portion of the vehicle environment, which may be conducted through the controller. In operation 735, method 730 includes generating perception information from the retrieved information of the selected portion of the vehicle environment. In operation 736, method 730 includes exhibiting the perception information, which may be conducted through the display. As discussed above, it should be appreciated that the display may exhibit the perception information at the side-view mirror assembly or at the console screen of the vehicle infotainment unit or at a combination of both these locations.

It is to be understood that the above disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Features of the system as well as the method disclosed herein can be deliverable to/implemented by a processing device, controller, or computer, which can include any existing programmable electronic control unit or dedicated electronic control unit. Similarly, the system features and method can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The system features and method can also be implemented in a software executable object. Alternatively, the system features and method can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to enhance vehicle-environment perception, the system comprising:
    a memory comprising one or more executable instructions;
    a controller configured to read and execute the one or more executable instructions;
    a camera configured to view or capture or view and capture an image of a selected portion of a vehicle environment;
    a display configured to exhibit information;
    a user input configured to allow one or more commands to be provided to the system;
    one or more accelerometers placed in at least one of various locations around a vehicle, each of the one or more accelerometers is a vibratory sensor configured to determine when the vehicle encounters a road surface feature based on detected vibrations and send a corresponding sensor signal to the controller, wherein the various locations around the vehicle include the interior cabin, steering wheel, and at least one wheel well; and
    wherein the executable instructions enable the controller to:
        receive the sensor signal and responsively operate the camera;
        operate the camera based on the one or more commands;
        receive, from the camera, information of the selected portion of the vehicle environment;
        generate perception information from the information of the selected portion of the vehicle environment; and
        exhibit, through the display, the perception information.

2. The system of claim 1, further comprising:
    a communication device configured to signally communicate with a remote party; and
    wherein the executable instructions enable the controller to receive the sensor signal and, via the communication device, send an output signal to the remote party.

3. The system of claim 2, wherein the road surface feature encountered by the vehicle is a pothole, speed bump, curb, racetrack finish line, road lane indicators, mud pits, water puddles, or a wet surface.

4. The system of claim 2, wherein:
    the camera is positioned at the side-view mirror assembly of the vehicle; and
    the display is configured to exhibit the perception information at the side-view mirror assembly.

5. The system of claim 2, wherein:
    the camera is positioned at the side-view mirror assembly of the vehicle; and
    the display is configured to exhibit the perception information at the console screen of the vehicle infotainment unit.

6. The system of claim 2, wherein the selected portion of the vehicle environment substantially comprises the location at which a front tire and its respective underlying surface meet.

7. The system of claim 2, wherein executable instructions further enable the controller to record and store the perception information to the memory.

8. A system to enhance vehicle-environment perception, the system comprising:
a memory comprising one or more executable instructions;
a controller configured to read and execute the one or more executable instructions;
a plurality of cameras configured to view or capture or view and capture images of selected portions of a vehicle environment, the plurality of cameras being positioned at first and second side-view mirror assemblies of a vehicle;
a display configured to exhibit information;
a user input configured to allow one or more commands to be provided to the system;
a communication device configured to signally communicate with a remote party;
one or more accelerometers placed in at least one of various locations around the vehicle, each of the one or more accelerometers is a vibratory sensor configured to determine when the vehicle encounters one or more road surface features based on detected vibrations and send a corresponding sensor signal to the controller, wherein the various locations around the vehicle include the interior cabin, steering wheel, and at least one wheel well, and wherein each road surface feature is a pothole, speed bump, curb, racetrack finish line, road lane indicators, mud pits, water puddles, or a wet surface; and
wherein the executable instructions enable the controller to:
receive the sensor signal and responsively operate the camera;
operate the communications device to send an output signal to the remote party;
operate the plurality of cameras based on the one or more commands;
receive, from the plurality of cameras, information of the selected portions of the vehicle environment, wherein the selected portions of the vehicle environment comprise the locations where each front tire and its respective underlying surface meet;
generate perception information from the information of the selected portions of the vehicle environment;
exhibit, through the display, the perception information from at least one of the cameras; and
record and store the perception information to the memory.

9. The system of claim 8, further comprising:
an additional display configured to exhibit additional information; and
wherein the display is configured to exhibit the perception information at the first side-view mirror assembly and the additional display is configured to exhibit additional perception information at the second side-view mirror assembly.

10. The system of claim 8, wherein:
the display is configured to exhibit the perception information at the console screen of the vehicle infotainment unit.

11. A method to enhance vehicle-environment perception, the method comprising:
providing a camera positioned at the side-view mirror assembly of a vehicle, the camera configured to view or capture or view and capture an image of the location at which a front tire and its respective underlying surface meet;
providing a display configured to exhibit information;
providing a user input configured to allow one or more commands to be provided to the camera;
providing one or more accelerometers placed in at least one of various locations around a vehicle, each of the one or more accelerometers is a vibratory sensor configured to determine when the vehicle encounters a road surface feature based on detected vibrations and send a corresponding sensor signal to the controller, wherein the various locations around the vehicle include the interior cabin, steering wheel, and at least one wheel well;
receiving the sensor signal, via the one or more accelerometers, and responsively operate the camera;
commanding operation of the camera, via the user input;
viewing or capturing or viewing and capturing, via the camera, an image of the location at which the front tire and its respective underlying surface meet;
receiving from the camera, via a controller, information of the location at which the front tire and its respective underlying surface meet;
generating perception information, via the controller, from the information of location at which the front tire and its respective underlying surface meet; and
exhibiting, via the display, the perception information.

12. The method of claim 11, wherein the display is configured to exhibit the perception information at the side-view mirror assembly.

13. The method of claim 11, wherein the display is configured to exhibit the perception information at the console screen of the vehicle infotainment unit.

14. The method of claim 8, further comprising:
providing a communication device configured to signally communicate with a remote party;
receiving the sensor signal via the communication device; and sending an output signal to the remote party based on the sensor signal.

15. The method of claim 8, wherein the road surface feature encountered by the vehicle is a pothole, speed bump, curb, racetrack finish line, road lane indicators, mud pits, water puddles, or a wet surface.

16. The method of claim 8, further comprising recording and storing the perception information to a memory.

* * * * *